United States Patent
Diamond

(10) Patent No.: US 8,704,275 B2
(45) Date of Patent: Apr. 22, 2014

(54) SEMICONDUCTOR DIE MICRO ELECTRO-MECHANICAL SWITCH MANAGEMENT METHOD

(75) Inventor: Michael B. Diamond, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 12/005,691

(22) Filed: Dec. 28, 2007

(65) Prior Publication Data

US 2008/0106328 A1 May 8, 2008

Related U.S. Application Data

(62) Division of application No. 10/942,209, filed on Sep. 15, 2004.

(51) Int. Cl.
*H01L 23/52* (2006.01)

(52) U.S. Cl.
USPC ............ 257/209; 257/415; 438/130; 200/181

(58) Field of Classification Search
USPC ............ 257/209, 254, 415; 438/130; 200/181
See application file for complete search history.

(56) References Cited

U.S. PATENT DOCUMENTS

| | | |
|---|---|---|
| 3,940,740 A | 2/1976 | Coontz |
| 4,208,810 A | 6/1980 | Rohner et al. |
| 4,412,281 A | 10/1983 | Works |
| 4,449,730 A | 5/1984 | Oberleitner et al. |
| 4,541,075 A | 9/1985 | Dill et al. |
| 4,773,044 A | 9/1988 | Sfarti et al. |
| 4,885,703 A | 12/1989 | Deering |
| 4,918,626 A | 4/1990 | Watkins et al. |
| 4,949,280 A | 8/1990 | Littlefield |
| 4,951,220 A | 8/1990 | Ramacher et al. |
| 4,985,988 A | 1/1991 | Littlebury |

(Continued)

FOREIGN PATENT DOCUMENTS

| | | |
|---|---|---|
| CN | 101093578 | 12/2007 |
| JP | 61020348 A2 | 1/1986 |

(Continued)

OTHER PUBLICATIONS

Eckert, et al; Functional Component Coordinated Reconfiguration System and Method; U.S. Appl. No. 11/454,313, filed Jun. 16, 2006.

(Continued)

*Primary Examiner* — Steven J Fulk

(57) ABSTRACT

A die micro electro-mechanical switch management system and method facilitate power conservation by selectively preventing electrical current from flowing in designated components. A present invention semiconductor die comprises a block of transistors for performing switching operations, a bus (e.g., a power bus, a signal bus, etc.) for conveying electrical current and a micro electro-mechanical switch that couples and decouples the block of transistors to and from the bus. The micro electro-mechanical switch is opened and closed depending upon operations (e.g., switching operations) being performed by the block of transistors. Electrical current is prevented from flowing to the block of transistors when the micro electro-mechanical switch is open and the block of transistors is electrically isolated. The micro electro-mechanical switch can interrupt electrical current flow in a plurality of the bus lines and/or can be included in a relay array.

20 Claims, 7 Drawing Sheets

(56) References Cited

U.S. PATENT DOCUMENTS

| | | |
|---|---|---|
| 5,036,473 A | 7/1991 | Butts et al. |
| 5,077,660 A | 12/1991 | Haines et al. |
| 5,081,594 A | 1/1992 | Horsley |
| 5,107,455 A | 4/1992 | Haines et al. |
| 5,125,011 A | 6/1992 | Fung |
| 5,276,893 A | 1/1994 | Savaria |
| 5,287,438 A | 2/1994 | Kelleher |
| 5,313,287 A | 5/1994 | Barton |
| 5,379,405 A | 1/1995 | Ostrowski |
| 5,392,437 A | 2/1995 | Matter et al. |
| 5,400,777 A | 3/1995 | Olsson et al. |
| 5,408,606 A | 4/1995 | Eckart |
| 5,432,898 A | 7/1995 | Curb et al. |
| 5,446,836 A | 8/1995 | Lentz et al. |
| 5,448,496 A | 9/1995 | Butts et al. |
| 5,452,104 A | 9/1995 | Lee |
| 5,452,412 A | 9/1995 | Johnson, Jr. et al. |
| 5,455,536 A | 10/1995 | Kono et al. |
| 5,483,258 A | 1/1996 | Cornett et al. |
| 5,498,975 A | 3/1996 | Cliff et al. |
| 5,513,144 A | 4/1996 | O'Toole |
| 5,513,354 A | 4/1996 | Dwork et al. |
| 5,517,666 A | 5/1996 | Ohtani et al. |
| 5,530,457 A | 6/1996 | Helgeson |
| 5,543,935 A | 8/1996 | Harrington |
| 5,570,463 A | 10/1996 | Dao |
| 5,574,847 A | 11/1996 | Eckart et al. |
| 5,578,976 A | 11/1996 | Yao |
| 5,594,854 A | 1/1997 | Baldwin et al. |
| 5,623,692 A | 4/1997 | Priem et al. |
| 5,630,171 A | 5/1997 | Chejlava, Jr. et al. |
| 5,633,297 A | 5/1997 | Valko et al. |
| 5,634,107 A | 5/1997 | Yumoto et al. |
| 5,638,946 A | 6/1997 | Zavracky |
| 5,664,162 A | 9/1997 | Dye |
| 5,671,376 A | 9/1997 | Bucher et al. |
| 5,694,143 A | 12/1997 | Fielder et al. |
| 5,705,938 A | 1/1998 | Kean |
| 5,766,979 A | 6/1998 | Budnaitis |
| 5,768,178 A | 6/1998 | McLaury |
| 5,778,348 A | 7/1998 | Manduley et al. |
| 5,805,833 A | 9/1998 | Verdun |
| 5,809,230 A | 9/1998 | Pereira |
| 5,815,162 A | 9/1998 | Levine |
| 5,821,949 A | 10/1998 | Deering |
| 5,854,631 A | 12/1998 | Akeley et al. |
| 5,854,637 A | 12/1998 | Sturges |
| 5,872,902 A | 2/1999 | Kuchkuda et al. |
| 5,884,053 A | 3/1999 | Clouser et al. |
| 5,896,391 A | 4/1999 | Solheim et al. |
| 5,909,595 A | 6/1999 | Rosenthal et al. |
| 5,913,218 A | 6/1999 | Carney et al. |
| 5,937,173 A | 8/1999 | Olarig et al. |
| 5,956,252 A | 9/1999 | Lau et al. |
| 5,956,505 A | 9/1999 | Manduley |
| 5,968,175 A | 10/1999 | Morishita et al. |
| 5,977,987 A | 11/1999 | Duluk, Jr. |
| 5,996,996 A | 12/1999 | Brunelle |
| 5,999,990 A | 12/1999 | Sharrit et al. |
| 6,003,100 A | 12/1999 | Lee |
| 6,028,608 A | 2/2000 | Jenkins |
| 6,034,699 A | 3/2000 | Wong et al. |
| 6,038,348 A | 3/2000 | Carley |
| 6,049,870 A | 4/2000 | Greaves |
| 6,065,131 A | 5/2000 | Andrews et al. |
| 6,067,262 A | 5/2000 | Irrinki et al. |
| 6,067,633 A | 5/2000 | Robbins et al. |
| 6,069,540 A | 5/2000 | Berenz et al. |
| 6,072,500 A | 6/2000 | Foran et al. |
| 6,072,686 A | 6/2000 | Yarbrough |
| 6,085,269 A | 7/2000 | Chan et al. |
| 6,094,116 A | 7/2000 | Tai et al. |
| 6,098,118 A | 8/2000 | Ellenby et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,129,070 A | 10/2000 | Jingu et al. |
| 6,137,918 A | 10/2000 | Harrington et al. |
| 6,160,557 A | 12/2000 | Narayanaswami |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,219,628 B1 | 4/2001 | Kodosky et al. |
| 6,249,288 B1 | 6/2001 | Campbell |
| 6,249,853 B1 | 6/2001 | Porterfield |
| 6,255,849 B1 | 7/2001 | Mohan |
| 6,256,758 B1 | 7/2001 | Abramovici et al. |
| 6,259,460 B1 | 7/2001 | Gossett et al. |
| 6,307,169 B1 | 10/2001 | Sun et al. |
| 6,317,804 B1 | 11/2001 | Levy et al. |
| 6,323,699 B1 | 11/2001 | Quiet |
| 6,323,874 B1 | 11/2001 | Gossett |
| 6,348,811 B1 | 2/2002 | Haycock et al. |
| 6,359,623 B1 | 3/2002 | Larson |
| 6,362,819 B1 | 3/2002 | Dalal et al. |
| 6,363,285 B1 | 3/2002 | Wey |
| 6,363,295 B1 | 3/2002 | Akram et al. |
| 6,366,289 B1 | 4/2002 | Johns |
| 6,370,603 B1 | 4/2002 | Silverman et al. |
| 6,377,898 B1 | 4/2002 | Steffan et al. |
| 6,388,590 B1 | 5/2002 | Ng |
| 6,389,585 B1 | 5/2002 | Masleid et al. |
| 6,392,431 B1 | 5/2002 | Jones |
| 6,429,288 B1 | 8/2002 | Esswein et al. |
| 6,429,747 B2 | 8/2002 | Franck et al. |
| 6,429,877 B1 | 8/2002 | Stroyan |
| 6,433,657 B1 | 8/2002 | Chen |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,486,425 B2 | 11/2002 | Seki |
| 6,501,564 B1 | 12/2002 | Schramm et al. |
| 6,504,542 B1 | 1/2003 | Voorhies et al. |
| 6,504,841 B1 | 1/2003 | Larson et al. |
| 6,522,329 B1 | 2/2003 | Ihara et al. |
| 6,525,737 B1 | 2/2003 | Duluk, Jr. et al. |
| 6,529,207 B1 | 3/2003 | Landau et al. |
| 6,530,045 B1 | 3/2003 | Cooper et al. |
| 6,530,049 B1 | 3/2003 | Abramovici et al. |
| 6,535,986 B1 | 3/2003 | Rosno et al. |
| 6,550,030 B1 | 4/2003 | Abramovici et al. |
| 6,598,194 B1 | 7/2003 | Madge et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,629,181 B1 | 9/2003 | Alappat et al. |
| 6,633,197 B1 | 10/2003 | Sutardja |
| 6,633,297 B2 | 10/2003 | McCormack et al. |
| 6,636,212 B1 | 10/2003 | Zhu |
| 6,646,639 B1 | 11/2003 | Greene et al. |
| 6,662,133 B2 | 12/2003 | Engel et al. |
| 6,671,000 B1 | 12/2003 | Cloutier |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,700,581 B2 | 3/2004 | Baldwin et al. |
| 6,701,466 B1 | 3/2004 | Fiedler |
| 6,717,474 B2 | 4/2004 | Chen et al. |
| 6,717,576 B1 | 4/2004 | Duluk, Jr. et al. |
| 6,717,578 B1 | 4/2004 | Deering |
| 6,718,496 B1 | 4/2004 | Fukuhisa et al. |
| 6,734,770 B2 | 5/2004 | Aigner et al. |
| 6,734,861 B1 | 5/2004 | Van Dyke et al. |
| 6,738,856 B1 | 5/2004 | Milley et al. |
| 6,741,247 B1 | 5/2004 | Fenney |
| 6,741,258 B1 | 5/2004 | Peck, Jr. et al. |
| 6,742,000 B1 | 5/2004 | Fantasia et al. |

(56) References Cited

U.S. PATENT DOCUMENTS

| | | |
|---|---|---|
| 6,747,057 B2 | 6/2004 | Ruzafa et al. |
| 6,747,483 B2 | 6/2004 | To et al. |
| 6,765,575 B1 | 7/2004 | Voorhies et al. |
| 6,778,177 B1 | 8/2004 | Furtner |
| 6,782,587 B2 | 8/2004 | Reilly |
| 6,785,841 B2 | 8/2004 | Akrout et al. |
| 6,788,101 B1 | 9/2004 | Rahman |
| 6,788,301 B2 | 9/2004 | Thrasher |
| 6,794,101 B2 | 9/2004 | Liu et al. |
| 6,798,410 B1 | 9/2004 | Redshaw et al. |
| 6,803,782 B2 | 10/2004 | Koob et al. |
| 6,803,916 B2 | 10/2004 | Ramani et al. |
| 6,806,788 B1 | 10/2004 | Marumoto |
| 6,819,332 B2 | 11/2004 | Baldwin |
| 6,823,283 B2 | 11/2004 | Steger et al. |
| 6,825,847 B1 | 11/2004 | Molnar et al. |
| 6,833,835 B1 | 12/2004 | van Vugt |
| 6,849,924 B2 | 2/2005 | Allison et al. |
| 6,850,133 B2 | 2/2005 | Ma |
| 6,861,865 B1 | 3/2005 | Carlson |
| 6,862,027 B2 | 3/2005 | Andrews et al. |
| 6,879,207 B1 | 4/2005 | Nickolls |
| 6,906,716 B2 | 6/2005 | Moreton et al. |
| 6,938,176 B1 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,961,065 B2 | 11/2005 | Sasaki |
| 6,966,020 B1 | 11/2005 | Abramovici et al. |
| 6,973,608 B1 | 12/2005 | Abramovici et al. |
| 6,978,317 B2 | 12/2005 | Anantha et al. |
| 6,982,718 B2 | 1/2006 | Kilgard et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,020,598 B1 | 3/2006 | Jacobson |
| 7,023,437 B1 | 4/2006 | Voorhies et al. |
| 7,043,622 B2 | 5/2006 | Henry et al. |
| 7,058,738 B2 | 6/2006 | Stufflebeam, Jr. |
| 7,061,495 B1 | 6/2006 | Leather |
| 7,064,771 B1 | 6/2006 | Jouppi et al. |
| 7,069,369 B2 | 6/2006 | Chou et al. |
| 7,069,458 B1 | 6/2006 | Sardi et al. |
| 7,069,558 B1 | 6/2006 | Stone et al. |
| 7,075,542 B1 | 7/2006 | Leather |
| 7,075,797 B1 | 7/2006 | Leonard et al. |
| 7,081,902 B1 | 7/2006 | Crow et al. |
| 7,085,824 B2 | 8/2006 | Forth et al. |
| 7,119,809 B1 | 10/2006 | McCabe |
| 7,124,318 B2 | 10/2006 | Luick |
| 7,126,600 B1 | 10/2006 | Fowler et al. |
| 7,136,953 B1 | 11/2006 | Bisson et al. |
| 7,154,066 B2 | 12/2006 | Talwar et al. |
| 7,158,148 B2 | 1/2007 | Toji et al. |
| 7,170,315 B2 | 1/2007 | Bakker et al. |
| 7,170,515 B1 | 1/2007 | Zhu |
| 7,174,407 B2 | 2/2007 | Hou et al. |
| 7,174,411 B1 | 2/2007 | Ngai |
| 7,184,040 B1 | 2/2007 | Tzvetkov |
| 7,185,135 B1 | 2/2007 | Briggs et al. |
| 7,185,225 B2 | 2/2007 | Sutardja et al. |
| 7,187,383 B2 | 3/2007 | Kent |
| 7,224,364 B1 | 5/2007 | Yue et al. |
| 7,246,274 B2 | 7/2007 | Kizer et al. |
| 7,260,007 B2 | 8/2007 | Jain et al. |
| RE39,898 E | 10/2007 | Nally et al. |
| 7,293,127 B2 | 11/2007 | Caruk |
| 7,305,571 B2 * | 12/2007 | Cranford et al. ............... 713/300 |
| 7,307,628 B1 | 12/2007 | Goodman et al. |
| 7,307,638 B2 | 12/2007 | Leather et al. |
| 7,324,458 B2 | 1/2008 | Schoenborn et al. |
| 7,340,541 B2 | 3/2008 | Castro et al. |
| 7,362,325 B2 | 4/2008 | Anderson |
| 7,373,547 B2 | 5/2008 | Sutardja et al. |
| 7,382,368 B1 | 6/2008 | Molnar et al. |
| 7,398,336 B2 | 7/2008 | Feng et al. |
| 7,414,636 B2 | 8/2008 | Kokojima et al. |
| 7,415,551 B2 | 8/2008 | Pescatore |
| 7,424,564 B2 | 9/2008 | Mehta et al. |
| 7,437,021 B2 | 10/2008 | Satoh |
| 7,453,466 B2 | 11/2008 | Hux et al. |
| 7,480,808 B2 | 1/2009 | Caruk et al. |
| 7,483,029 B2 | 1/2009 | Crow et al. |
| 7,525,986 B2 | 4/2009 | Lee et al. |
| 7,548,996 B2 | 6/2009 | Baker et al. |
| 7,551,174 B2 | 6/2009 | Iourcha et al. |
| 7,594,061 B2 | 9/2009 | Shen et al. |
| 7,633,506 B1 | 12/2009 | Leather et al. |
| 7,634,637 B1 | 12/2009 | Lindholm et al. |
| 7,663,633 B1 | 2/2010 | Diamond et al. |
| 7,782,325 B2 | 8/2010 | Gonzalez et al. |
| 7,791,617 B2 | 9/2010 | Crow et al. |
| 7,793,029 B1 | 9/2010 | Parson et al. |
| 7,965,902 B1 | 6/2011 | Zelinka et al. |
| 8,063,903 B2 | 11/2011 | Vignon et al. |
| 8,132,015 B1 | 3/2012 | Wyatt |
| 8,144,166 B2 | 3/2012 | Lyapunov et al. |
| 8,237,738 B1 | 8/2012 | Crow |
| 8,412,872 B1 | 4/2013 | Wagner et al. |
| 8,417,838 B2 | 4/2013 | Tamasi et al. |
| 8,482,567 B1 | 7/2013 | Moreton et al. |
| 8,532,098 B2 | 9/2013 | Reed et al. |
| 2001/0005209 A1 | 6/2001 | Lindholm et al. |
| 2002/0005729 A1 | 1/2002 | Leedy |
| 2002/0026623 A1 | 2/2002 | Morooka |
| 2002/0031025 A1 | 3/2002 | Shimano et al. |
| 2002/0050979 A1 | 5/2002 | Oberoi et al. |
| 2002/0059392 A1 | 5/2002 | Ellis, III |
| 2002/0087833 A1 | 7/2002 | Burns et al. |
| 2002/0091979 A1 | 7/2002 | Cooke et al. |
| 2002/0097241 A1 | 7/2002 | McCormack et al. |
| 2002/0120723 A1 | 8/2002 | Forth et al. |
| 2002/0130863 A1 | 9/2002 | Baldwin |
| 2002/0138750 A1 | 9/2002 | Gibbs et al. |
| 2002/0140655 A1 | 10/2002 | Liang et al. |
| 2002/0143653 A1 | 10/2002 | DiLena et al. |
| 2002/0158869 A1 | 10/2002 | Ohba et al. |
| 2002/0158885 A1 | 10/2002 | Brokenshire et al. |
| 2002/0196251 A1 | 12/2002 | Duluk, Jr. et al. |
| 2002/0199110 A1 | 12/2002 | Kean |
| 2003/0020173 A1 * | 1/2003 | Huff et al. ............... 257/774 |
| 2003/0023771 A1 | 1/2003 | Erickson et al. |
| 2003/0046472 A1 | 3/2003 | Morrow |
| 2003/0051091 A1 | 3/2003 | Leung et al. |
| 2003/0058244 A1 | 3/2003 | Ramani et al. |
| 2003/0061409 A1 | 3/2003 | RuDusky |
| 2003/0067468 A1 | 4/2003 | Duluk, Jr. et al. |
| 2003/0076325 A1 | 4/2003 | Thrasher |
| 2003/0093506 A1 | 5/2003 | Oliver et al. |
| 2003/0101288 A1 | 5/2003 | Tague et al. |
| 2003/0115500 A1 | 6/2003 | Akrout et al. |
| 2003/0122815 A1 | 7/2003 | Deering |
| 2003/0160795 A1 | 8/2003 | Alcorn et al. |
| 2003/0163589 A1 | 8/2003 | Bunce et al. |
| 2003/0164830 A1 | 9/2003 | Kent |
| 2003/0179631 A1 | 9/2003 | Koob et al. |
| 2003/0194116 A1 | 10/2003 | Wong et al. |
| 2003/0201994 A1 | 10/2003 | Taylor et al. |
| 2004/0012082 A1 | 1/2004 | Dewey et al. |
| 2004/0012597 A1 | 1/2004 | Zatz et al. |
| 2004/0046764 A1 | 3/2004 | Lefebvre et al. |
| 2004/0064628 A1 | 4/2004 | Chiu |
| 2004/0085313 A1 | 5/2004 | Moreton et al. |
| 2004/0102187 A1 | 5/2004 | Moller et al. |
| 2004/0130552 A1 | 7/2004 | Duluk, Jr. et al. |
| 2004/0183148 A1 | 9/2004 | Blasko, III |
| 2004/0183801 A1 | 9/2004 | Deering |
| 2004/0188781 A1 | 9/2004 | Bar |
| 2004/0196285 A1 | 10/2004 | Rice et al. |
| 2004/0196290 A1 | 10/2004 | Satoh |
| 2004/0207642 A1 | 10/2004 | Crisu et al. |
| 2004/0225787 A1 | 11/2004 | Ma et al. |
| 2004/0227599 A1 | 11/2004 | Shen et al. |

(56) References Cited

U.S. PATENT DOCUMENTS

| | | |
|---|---|---|
| 2004/0246251 A1 | 12/2004 | Fenney et al. |
| 2005/0030314 A1 | 2/2005 | Dawson |
| 2005/0041031 A1 | 2/2005 | Diard |
| 2005/0041037 A1 | 2/2005 | Dawson |
| 2005/0044284 A1 | 2/2005 | Pescatore |
| 2005/0045722 A1 | 3/2005 | Park |
| 2005/0060601 A1* | 3/2005 | Gomm ............................ 714/5 |
| 2005/0066148 A1 | 3/2005 | Luick |
| 2005/0088445 A1 | 4/2005 | Gonzalez et al. |
| 2005/0122338 A1 | 6/2005 | Hong et al. |
| 2005/0125629 A1 | 6/2005 | Kissell |
| 2005/0134588 A1 | 6/2005 | Aila et al. |
| 2005/0134603 A1 | 6/2005 | Iourcha et al. |
| 2005/0172135 A1 | 8/2005 | Wiersma |
| 2005/0173233 A1 | 8/2005 | Kaelberer |
| 2005/0174353 A1 | 8/2005 | Alcorn et al. |
| 2005/0179698 A1 | 8/2005 | Vijayakumar et al. |
| 2005/0182881 A1 | 8/2005 | Chou et al. |
| 2005/0210472 A1 | 9/2005 | Accapadi et al. |
| 2005/0237083 A1 | 10/2005 | Bakker et al. |
| 2005/0246460 A1 | 11/2005 | Stufflebeam, Jr. |
| 2005/0251761 A1 | 11/2005 | Diamond et al. |
| 2005/0259100 A1 | 11/2005 | Teruyama |
| 2005/0261863 A1 | 11/2005 | Van Dyke et al. |
| 2005/0275663 A1 | 12/2005 | Kokojima et al. |
| 2005/0278666 A1 | 12/2005 | Diamond |
| 2005/0285863 A1 | 12/2005 | Diamond |
| 2006/0033745 A1 | 2/2006 | Koselj et al. |
| 2006/0044317 A1 | 3/2006 | Bourd et al. |
| 2006/0053188 A1 | 3/2006 | Mantor et al. |
| 2006/0053189 A1 | 3/2006 | Mantor |
| 2006/0055641 A1 | 3/2006 | Robertus et al. |
| 2006/0106911 A1 | 5/2006 | Chapple et al. |
| 2006/0123177 A1 | 6/2006 | Chan et al. |
| 2006/0132495 A1 | 6/2006 | Anderson |
| 2006/0170690 A1 | 8/2006 | Leather |
| 2006/0190663 A1 | 8/2006 | Lu |
| 2006/0203005 A1 | 9/2006 | Hunter |
| 2006/0221086 A1 | 10/2006 | Diard |
| 2006/0245001 A1 | 11/2006 | Lee et al. |
| 2006/0252285 A1 | 11/2006 | Shen |
| 2006/0267981 A1 | 11/2006 | Naoi |
| 2006/0267987 A1 | 11/2006 | Litchmanov |
| 2006/0282604 A1 | 12/2006 | Temkine et al. |
| 2007/0038794 A1 | 2/2007 | Purcell et al. |
| 2007/0050647 A1 | 3/2007 | Conroy et al. |
| 2007/0067535 A1 | 3/2007 | Liu |
| 2007/0088877 A1 | 4/2007 | Chen et al. |
| 2007/0115271 A1 | 5/2007 | Seo et al. |
| 2007/0115290 A1 | 5/2007 | Polzin et al. |
| 2007/0115291 A1 | 5/2007 | Chen et al. |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |
| 2008/0100618 A1 | 5/2008 | Woo et al. |
| 2008/0198163 A1 | 8/2008 | Nakahashi et al. |
| 2008/0273218 A1 | 11/2008 | Kitora et al. |
| 2009/0044003 A1 | 2/2009 | Berthiaume et al. |

FOREIGN PATENT DOCUMENTS

| | | |
|---|---|---|
| JP | H04266768 A | 9/1992 |
| JP | 06180758 | 6/1994 |
| JP | 07-141526 | 6/1995 |
| JP | 10134198 | 5/1998 |
| JP | 11195132 | 7/1999 |
| JP | 11328133 A2 | 11/1999 |
| JP | 2001-005989 | 1/2001 |
| JP | 2002076120 A2 | 3/2002 |
| JP | 2005182547 | 7/2005 |
| TW | 1235341 | 7/2005 |
| TW | 0931127712 | 7/2005 |
| WO | 0013145 | 3/2000 |
| WO | 02054224 | 7/2002 |
| WO | 2005029329 | 3/2005 |

OTHER PUBLICATIONS

Diamond, et al; A System and Method for Remotely Configuring Semiconductor Functional Circuits; U.S. Appl. No. 10/740,779, filed Dec. 18, 2003.

Van Dyke, et al; A System and Method for Increasing Die Yield; U.S. Appl. No. 10/740,723, filed Dec. 18, 2003.

Diamond, et al; A System and Method for Configuring Semiconductor Functional Circuits; U.S. Appl. No. 10/740,722, filed Dec. 18, 2003.

Van Dyke, et al; An Integrated Circuit Configuration System and Method; U.S. Appl. No. 10/740,721, filed Dec. 18, 2003.

Diamond; Micro Electro Mechanical Switch System and Method for Testing and Configuring Semiconductor Functional Circuits; U.S. Appl. No. 10/942,169, filed Sep. 15, 2004.

Scotzniovsky, et al; Functional Component Compensation Reconfiguration System and Method; U.S. Appl. No. 11/472,865, filed Jun. 21, 2006.

Diamond; A System and Method for Configuring Semiconductor Functional Circuits; U.S. Appl. No. 10/876,340, filed Jun. 23, 2004.

Welsh, D., "Building Self-Reconfiguring Distributed Systems Using Compensating Reconfiguratuion", Proceedings Fourth International Conference on Configurable Distributed Systems, May 4-6, 1998; pp. 18-25.

European Patent Office E-Space Family List for: WO 2005/29329 (PCT/US 2004/030127).

International Search Report. PCT/US2004/030127. Mail Date Jun. 30, 2005.

PCT International Preliminary Report on Patentability. PCT/US2004/030127. International Filing Date Sep. 13, 2004. Applicant: Nvidia Corporation. Date of Issuance of this Report: Mar. 16, 2006.

Non Final Office Action, Mail Date Mar. 20, 2012; U.S. Appl. No. 10/740,721.

"Addressing the System-on-a-Chip Interconnect Woes Through Communication-Based Design" by Sgrol et al., DAC 2001, Jun. 18-22, 2001, copyright ACM.

"OSI Reference Model—The ISO Model of Architecture for Open Systems Interconnection," by Zimmermann, IEEE Transactions on Communicaions, Apr. 1980.

"SuperPaint: An Early Frame Buffer Graphics System", by Richard Shoup, IEEE Annals of the History of Computing, copyright 2001.

"Multimedia Processors" by Kuroda et al., Proceedings of the IEEE, Jun. 1998.

"Test Requirements for Embedded Core-based Systems and IEEE P1500" by Yervant Zorian, International Test Conference, copyright IEEE 1997.

PCI Express Card Electromechanical Specification Rev. 1.1, 2005, p. 87.

A parallel algorithm for polygon rasterization Juan Pineda Jun. 1988 ACM.

A VLSI architecture for updating raster-scan displays Satish Gupta, Robert F. Sproull, Ivan E. Sutherland Aug. 1981 ACM SIGGRAPH Computer Graphics, Proceedings of the 8th annual conference on Computer graphics and interactive techniques SIGGRAPH '81, vol. 15 Issue 3 Publisher: ACM Press.

Blythe, OpenGL Section 3.4.1, "Basic Line Segment Rasterization", Mar. 29, 1997, pp. 1-3.

Boyer, et al.; "Discrete Analysis for Antialiased Lines," Eurographics 2000; 3 Pages.

A hardware assisted design rule check architecture Larry Seiler Jan. 1982 Proceedings of the 19th conference on design automation DAC '82 Publisher: IEEE Press.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes", ACM; 1985; Department of Computer Science, University of North Carolina at Chapel Hill, Chapel Hill, NC 27514.

* cited by examiner

500

510

Fabricating a block of tranistors in a semiconductor die.

520

Laying a bus in the semiconductor die.

530

Fabricating a MEM switch in the path of the bus on the seconductor in a position to couple and decouple tha path of the bus.

FIG 5

SEMICONDUCTOR DIE MICRO ELECTRO-MECHANICAL SWITCH MANAGEMENT METHOD

RELATED APPLICATIONS

This application is related to the following Applications:

U.S. patent application Ser. No. 10/740,721, entitled "AN INTEGRATED CIRCUIT CONFIGURATION SYSTEM AND METHOD", filed on Dec. 18, 2003;

U.S. patent application Ser. No. 10/740,722, entitled "A SYSTEM AND METHOD FOR CONFIGURING SEMICONDUCTOR FUNCTIONAL CIRCUITS", filed on Dec. 18, 2003;

U.S. patent application Ser. No. 10/740,723, entitled "A SYSTEM AND METHOD FOR INCREASING DIE YIELD" filed on Dec. 18, 2003;

U.S. patent application Ser. No. 10/740,779, entitled "A SYSTEM AND METHOD FOR REMOTELY CONFIGURING SEMICONDUCTOR FUNCTIONAL CIRCUITS", filed on Dec. 18, 2003;

U.S. patent application Ser. No. 10/876,340, entitled "SYSTEM AND METHOD FOR TESTING AND CONFIGURING SEMICONDUCTOR FUNCTIONAL CIRCUITS", filed on Jun. 23, 2004;

U.S. patent application Ser. No. 10/942,169, entitled "MICRO ELECTRO MECHANICAL SWITCH SYSTEM AND METHOD FOR TESTING AND CONFIGURING SEMICONDUCTOR FUNCTIONAL CIRCUITS", filed on Sep. 15, 2004;

U.S. patent application Ser. No. 11/454,313, entitled "FUNCTIONAL COMPONENT COORDINATED RECONFIGURATION SYSTEM AND METHOD", filed on Jun. 16, 2006; and U.S. patent application Ser. No. 11/472,865, entitled "FUNCTIONAL COMPONENT COMPENSATION RECONFIGURATION SYSTEM AND METHOD", filed on Jun. 21, 2006.

This application claims the benefit and priority of and is a Divisional of U.S. patent application Ser. No. 10/942,209, entitled "A Semiconductor Die Micro Electro-mechanical Switch Management System and Method", filed on Sep. 15, 2004, which is incorporated herein by this reference.

FIELD OF THE INVENTION

The present invention relates to the field of semiconductor die management. In particular, the present invention relates to a semiconductor die micro electro-mechanical switch management system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Typically, electronic systems designed to produce these results consume power. Power consumption can have undesirable impacts and power conservation is often an important design objective. However, traditional attempts at power conservation are usually limited. For example, traditional power conservation attempts do not usually reduce power consumption associated with leakage currents.

A number of electronic systems include semiconductor dies with various components that are utilized to perform a variety of operations. For example, the basic electronic component for performing switching operations in a typical semiconductor die is a transistor. Transistors typically consume energy when switching states and the more times a transistor switches states the more energy it consumes. Modern applications typically include some functions that require a semiconductor die (e.g., processor) to have a relatively large number of transistors and can require the transistor to change states a significant number of times at a relatively fast rate. However, applications also usually include a number of functions that may only involve a relatively few transistors that switch states.

A number of the electronic systems include components that significantly drain the resources and/or reduce the life of a typical limited power source even when not performing switching operations. For example, transistors typically consume some energy due to leakage current even when they are not switching states. While the power consumed by an individual transistor due to leakage current may be relatively small, the aggregate power loss for a large number of transistors can become significant. This power consumption is usually undesirable, especially in systems with limited power supplies.

There are a number of traditional mechanisms that attempt to conserve power in a semiconductor die. For example, some traditional systems attempt to conserver power by clock gating or switching off a clock to a certain number of transistors which stops the transistors from performing switching operations. However, even though the transistor is not switching states in accordance with a clock signal, transistor still typically consumes power due to leakage current. Energy resources for a number of systems are often limited and are expended quickly (e.g., battery power sources in portable devices such as a laptop computer).

SUMMARY

The present invention enables efficient selective isolation of electrical components in a semiconductor die. A present invention semiconductor die micro electro-mechanical switch management system and method facilitates power conservation by selectively preventing current from flowing in designated components and minimizing adverse impacts associated with leakage current. In one embodiment, a semiconductor die comprises a block of transistors, a bus and a micro electro-mechanical switch. The block of transistors perform switching operations. The bus conveys electric current to the transistors. The micro electro-mechanical switch couples and decouples the block of transistors to and from the bus for conveying electric current. The micro electro-mechanical switch is opened and closed depending upon operations the block of transistors are utilized for. The micro electro-mechanical switch is opened when the block of transistors are not being utilized to perform switching operations and the micro electro-mechanical switch prevents electrical current from flowing to the block of transistors when the Micro electro-mechanical switch is open. The block of transistors are electrically isolated when the micro electro-mechanical switch is open. The micro electro-mechanical switch interrupts electrical current flow in a plurality of the bus lines when the micro electro-mechanical switch is open and the micro electro-mechanical switch permits electrical current to flow to the block of transistors when the Micro electro-mechanical switch is opened. In one exemplary implementation, the bus is a power bus and/or a signal bus.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 5 is flow chart of an exemplary semiconductor die fabrication method in accordance with one embodiment of the present invention.

DETAILED DESCRIPTION

Figure 1:
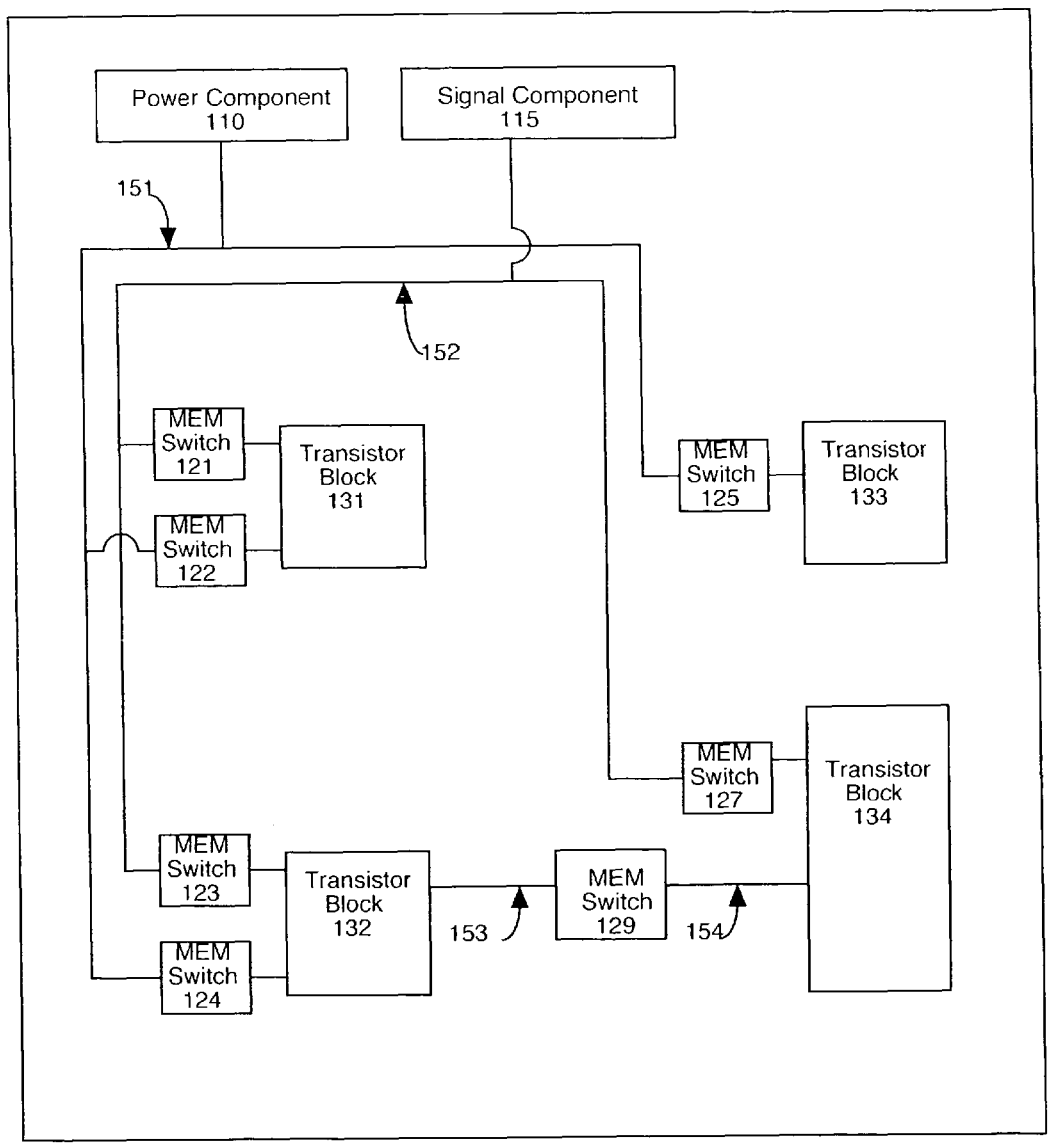
FIG. 1 is a block diagram of an exemplary micro electro-mechanical switch semiconductor die management system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

FIG. 1 is a block diagram of semiconductor die micro electro-mechanical switch management system 100 in accordance with one embodiment of the present invention. Semiconductor die micro electro-mechanical switch management system 100 includes power component 110, signal component 115, power bus 151, signal buses 152 and 153, transistors blocks 131 through 134 and micro electro-mechanical switches 121 through 128. Power bus 151 is coupled to power component 110 and micro electro-mechanical switches 122, 124, and 125. Signal bus 152 is coupled to signal component 115 and micro electro-mechanical switches 121, 123, and 127. Signal bus 153 is coupled to micro electro-mechanical switch 128 and transistor blocks 132 and 134.

The components of semiconductor die micro electro-mechanical switch management system 100 cooperatively operate to manage power consumption while performing various operations. Power component 110 (e.g., a voltage regulator) supplies power for components of semiconductor die micro electro-mechanical switch management system 100. Power bus 151 distributes power from power component 110. In one exemplary implementation, power bus 151 is a power rail distribution system. Micro electro-mechanical switches 122, 124 and 125 couple and decouple transistor blocks 131 through 133 to and from power bus 151. Transistor blocks 131 through 134 perform transistor switching operations. Signal component 115 (e.g., a clock regulator) supplies signals for components of semiconductor die micro electro-mechanical management system 100. Signal bus 152 distributes signals from signal component 110. Micro electro-mechanical switches 121, 123 and 127 couple and decouple transistor blocks 131, 132 and 134 to and from signal bus 152. Signal buses 153 and 154 communicate signals between transistor block 132 and 134. Micro electro-mechanical switch 128 couples and decouples signal buses 153 and 154.

In one embodiment of the present invention, semiconductor die micro electro-mechanical switch management system 100 is utilized to conserve power. Micro electro-mechanical switches 122, 124, and 125 are turned off and on (e.g., contacts are opened and closed) to prevent or permit current to flow from power bus 151 to transistor blocks 131 through 133 respectively. For example, when the transistors in transistor blocks 131 through 133 are not being utilized to perform switching operations contacts in the respective micro electro-mechanical switches 122, 124, and 125 are opened. Opening and closing the contacts in micro electro-mechanical switches 122, 124 and 125 breaks the conductive path of power bus 151 preventing current from flowing to transistor blocks 131 through 133. Opening the contacts physically "isolates" transistor blocks 131 through 133 and leakage current can not flow through the transistors included in transistor blocks 131 through 133.

In one exemplary implementation, micro electro-mechanical switches 121, 123, and 127 perform a similar "isolation" function. Micro electro-mechanical switches 121, 123, and 127 are turned off and on (e.g., contacts are opened and closed) to prevent or permit current to flow from signal bus 152 to transistor blocks 131, 132 and 134 respectively. For example, when the transistors in transistor blocks 131, 132 and 134 are not being utilized to perform switching operations contacts in the respective micro electro-mechanical switches 121, 123, and 127 are opened. Opening and closing the contacts in micro electro-mechanical switches 121, 123 and 127 breaks the conductive path of signal bus 152 preventing signals from being communicated to transistor blocks 131 through 134. Opening the contacts physically "isolates" the transistor blocks 131 through 134 and leakage current can not flow through the transistors included in transistor blocks 131 through 134. In an implementation in which the signals on signal bus 152 are clock signals, the micro electro-mechanical switches 121, 123, and 127 also prevent transistors from performing switching operations by preventing the clock signal from reaching the transistors.

A micro electro-mechanical switch can also be utilized to prevent signals from flowing between transistor blocks. Micro electro-mechanical switch 129 is turned off and on (e.g., contacts are opened and closed) to prevent or permit current flow between transistor block 132 and 134. For example, when either transistor blocks 132 or 134 are not being utilized to perform switching operations contacts in micro electro-mechanical switch 129 are opened. Opening and closing the contacts in micro electro-mechanical switch 129 breaks the conductive path of signal bus 153 and 154 preventing signals from being communicated between transistor blocks 132 through 134 via signal buses 153 and 154. Opening the contacts physically "isolates" the transistor blocks and prevents signals between the transistor blocks from acting as a leakage current source.

In one embodiment of the present invention, the micro electro-mechanical switches can also be utilized to facilitate testing operations. For example, micro electro-mechanical switches 121 through 129 can be opened or closed to facilitate isolation of particular transistor blocks. The micro electro-mechanical switches 121 through 128 can be opened or closed to assist troubleshooting efforts. The micro electro-mechanical switches 121 through 128 can also be opened or closed to create different conductive paths.

Figure 2:
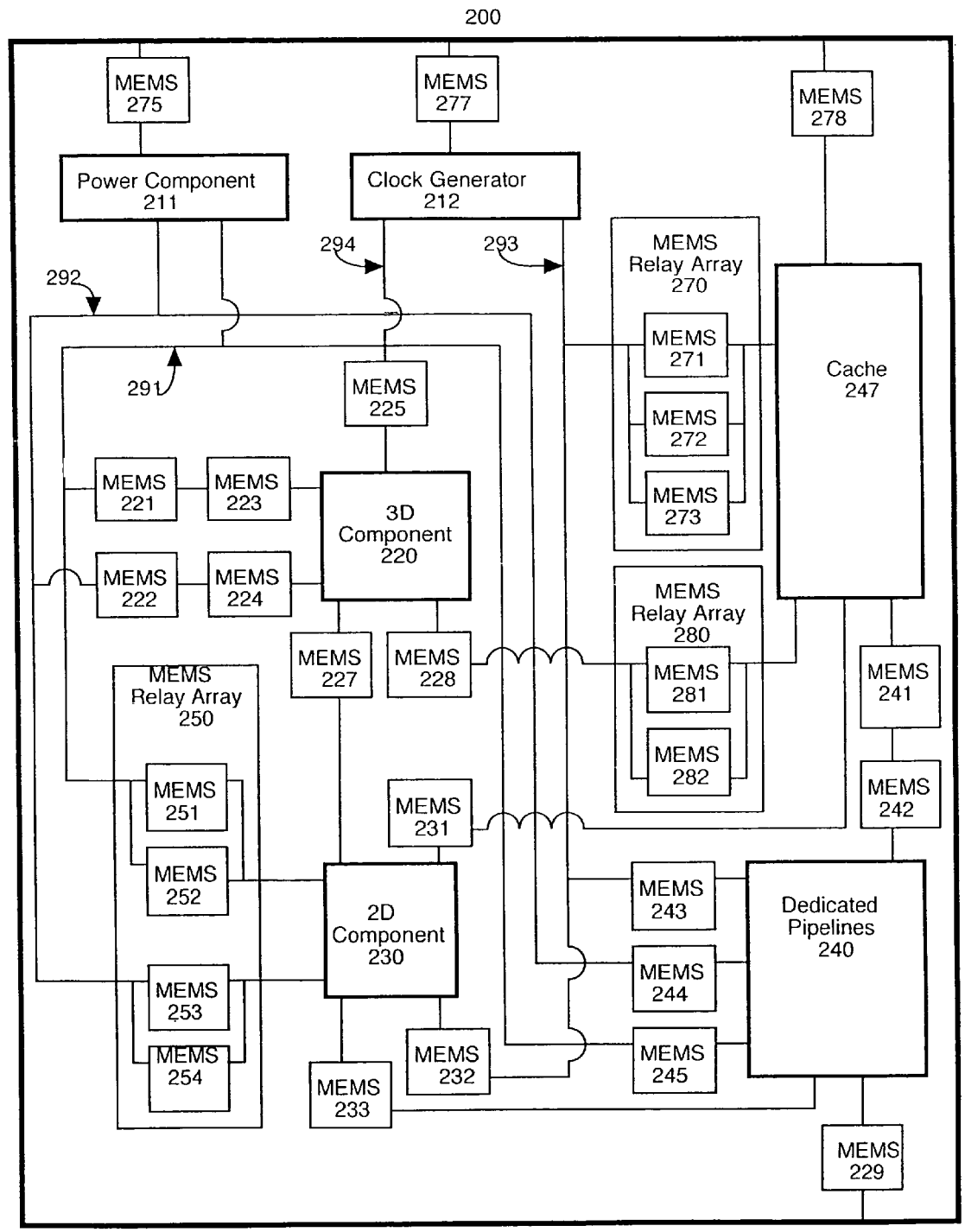
FIG. 2 is a block diagram of an exemplary micro electro-mechanical switch semiconductor die management system implemented in a graphics processing die in accordance with one embodiment of the present invention.

It is appreciated that the present invention can be implemented in a number of different semiconductor dies. For example, FIG. 2 is a block diagram of a semiconductor die micro electro-mechanical switch management system implemented in a graphics processing die 200 in accordance with one embodiment of the present invention. Graphics processing die 200 includes power component 211, clock generator 212, three dimensional (3D) component 220, two dimensional component (2D) 230, cache 247 and dedicated graphics pipelines 240. The components of graphics processing die 200 are selectively coupled by micro electro-mechanical switches and buses. For example, micro electro-mechanical switches 244 and 245 selectively couple dedicated graphics pipelines 240 to a first power bus 291 and a second power bus 292, both of which are coupled to power component 211. Micro electro-mechanical switch 225 selectively couples and decouples 3D component 220 to and from a second clock signal bus 294. Micro electro-mechanical switches 232 and 243 selectively 2D component 230 and dedicated graphics pipeline 240 respectively to a first clock signal bus 293.

The micro electro-mechanical switches can be configured in plurality of different configurations to achieve a variety of objectives. Micro electro-mechanical switches can be coupled in series. For example, micro electro-mechanical switches 221 and 223 sequentially selectively couple 3D component 220 to a first power bus 291 and micro electro-mechanical switches 222 and 224 sequentially selectively couple 3D component 220 to a second power bus 292. The micro electro-mechanical switches can be included in a relay array configuration. For example, relay array component 270 includes a block of micro electro-mechanical switches 271 though 273 which selectively couple cache 247 to a first clock signal bus 293 coupled to clock generator 221. A relay array component can include multiple relay banks. For example, relay array component bank 250 includes a first relay bank of micro electro-mechanical switches 251 and 252 and a second relay bank of 253 and 254 which selectively couple and decouple 2D component 230 to and from power buses 291 and 292 respectively.

The micro electro-mechanical switches can be also be utilized to selectively couple and decouple signals between operational components. For example, micro electro-mechanical switch 227 selectively couples and decouples signals between 3D component 220 and 2D component 230 and micro electro-mechanical switch 231 selectively couples and decouples signals between 2D component 230 and cache 247. The micro electro-mechanical switches utilized to selectively couple and decouple signals between operational component can also be included in a relay array configuration. For example relay array 280 includes micro electro-mechanical switches 281 and 282. The micro electro-mechanical switches 241 and 242 sequentially selectively couple and decouple cache 247 and dedicated graphics pipelines 240. In one embodiment, micro electro-mechanical switches can be also be utilized to selectively couple and decouple electrical current and signals to and from external components. For example, micro electro-mechanical switch 275 through 279 selectively couples and decouples signals to and from external components (not shown).

Including multiple micro electro-mechanical switches in a path (e.g., in the path of power bus 291, signal bus 294, etc.) provides a number of potential benefits. Multiple micro electro-mechanical switches can be included in a path to help reduce wear and tear associated with making and breaking contacts on an otherwise single micro electro-mechanical switch. Multiple micro electro-mechanical switches can be included in a path to provide redundancy in case of a micro electro-mechanical switch failure or faulty operation.

It is appreciated that present invention micro electro-mechanical switches can be utilized to control leakage current at the boundaries of a die. For example, MEM switches 275 through 278 and 229 can be utilized to control the flow of current at the boundaries of graphics processing die 200. The MEM switches can be utilized to control the flow of current between multiple die coupled on a single substrate and/or multiple die stacked in a single package. For example, a present invention MEM switch can be utilized to control current flow to and/or from a communication die (e.g., for processing associated with base band communications), a memory die (e.g., a flash memory), an accessory application die (e.g., graphics, camera, music player, etc.) included in a single package (e.g. a chip in a cell phone).

It is also appreciated that present invention micro electromechanical switches can be controlled by a variety of different mechanisms. For example, the micro electro-mechanical switches can be controlled by hardware, software and/or combinations of both. In one exemplary implementation, operations associated with various transistor blocks (e.g. transistor blocks 131 through 134) are monitored and if switching operations within a transistor block fall below a predetermined level (e.g., not actively changing states for a predetermined period of time) then the micro electro-mechanical switches (e.g., MEM switch 122, 124 and 125 for power and MEM switch 121, 123 and 125 for signals) coupled to the transistor block can be "opened" and prevent current from flowing to the transistor block. Activities associated with various functional blocks (e.g., three dimensional (3D) component 220, two dimensional component (2D) 230, cache 247 and dedicated graphics pipelines 240) can also be monitored and if a functional block activities fall below a predetermined level (e.g., no 3D, 2D, cache or graphics pipeline activities respectively for a predetermined period of time) then the micro electro-mechanical switches coupled to the functional component can be "opened" and prevent current from flowing to the functional blocks. When additional operational operations of the transistor blocks or activities of the functional blocks are scheduled, the micro electro-mechanical switches are "closed" to permit current to flow to the respective transistor blocks and/or functional blocks.

Figure 3:
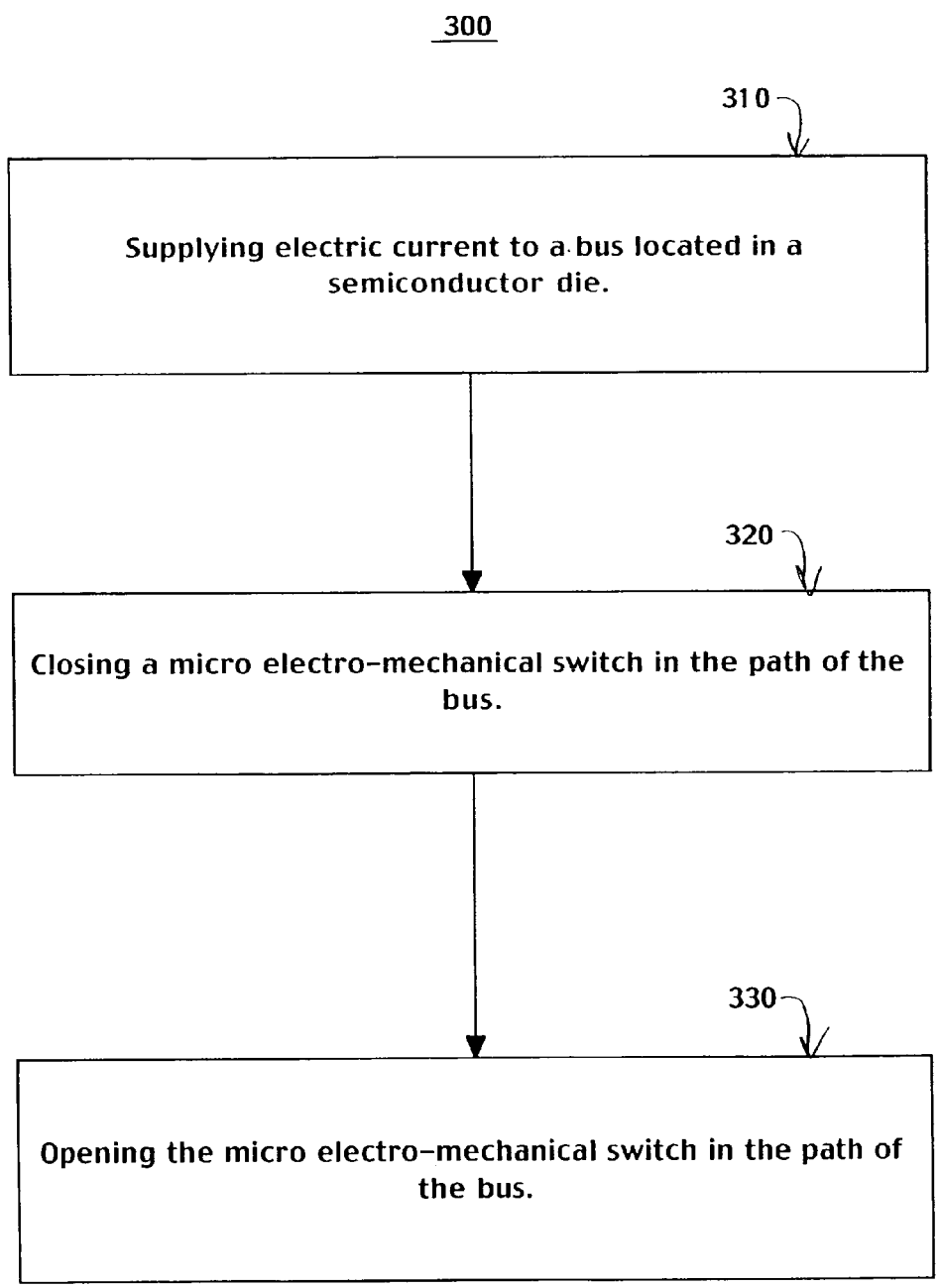
FIG. 3 is a flow chart of an exemplary micro electro-mechanical switch semiconductor die management method in accordance with one embodiment of the present invention.

FIG. 3 is a flow chart of semiconductor die micro electromechanical switch management method 300 in accordance with one embodiment of the present invention. Semiconductor die micro electro-mechanical switch management method 300 facilitates control of electrical current flow in a semiconductor chip. For example, semiconductor die micro electromechanical switch management method 300 can be utilized to selectively prevent electrical current from flowing to components that are not being utilized to perform switching operations.

In step 310, electrical current is supplied to a bus located in a semiconductor die. For example, the electric current can come from a component included in the semiconductor die (e.g., a power control component, a clock control component, a block of transistors, etc.) or from an external source (e.g., external power source, external clock generator, communication network, etc.). In one exemplary implementation, the bus is a power rail included in the semiconductor die.

In step 320, a micro electro-mechanical switch in the path of the bus is closed. In one embodiment, when the micro electro-mechanical switch is closed the bus is coupled to a transistor and conveys electric current to the transistor. For example, power and/or a signal is conveyed to the transistor if the micro electro-mechanical switch is closed. In one exemplary implementation, the micro electro-mechanical switch is closed if components (e.g., transistors) coupled to the micro electro-mechanical switch are being utilized to perform operations (e.g., are switching logical states).

In step 330, a micro electro-mechanical switch in the path of the bus is opened. In one embodiment, when the micro electro-mechanical switch is opened the bus is uncoupled from a transistor and electric current is not conveyed to the transistor. For example, power and/or a signal does not flow to the transistor if the micro electro-mechanical switch is opened. In one exemplary implementation, the micro electro-mechanical switch is opened if the components (e.g., transistors) coupled to the micro electro-mechanical switch are not being utilized to perform operations (e.g., are not switching logical states).

Figure 4A:
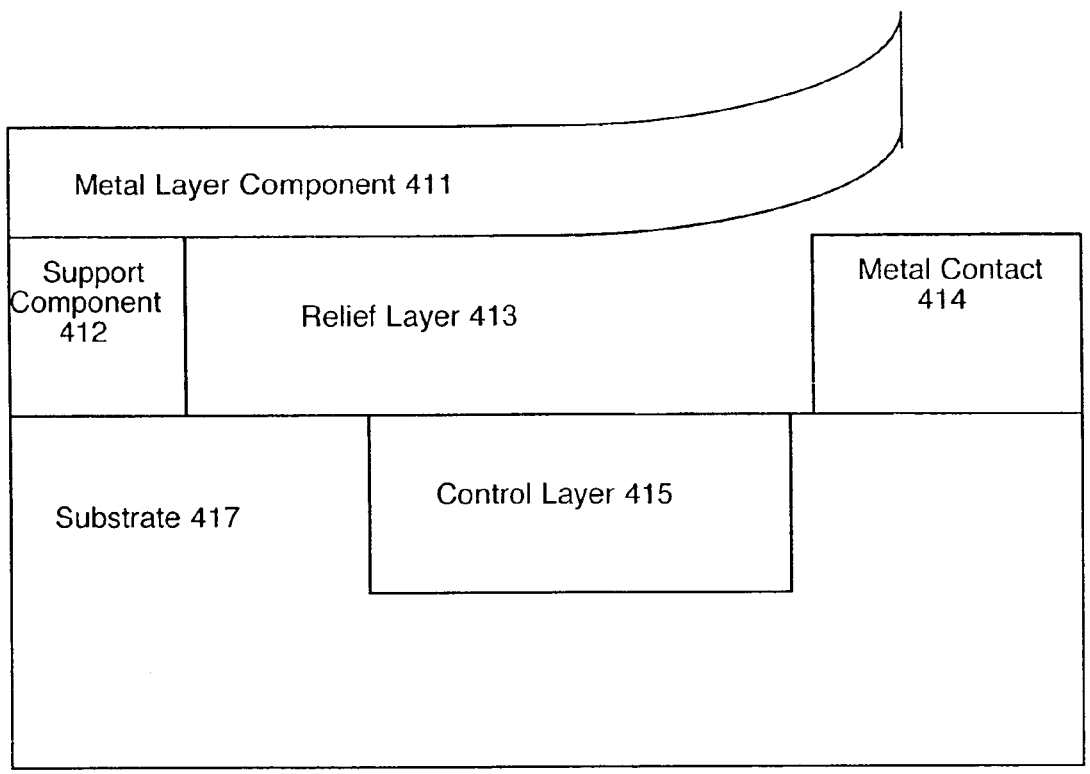
FIG. 4A is a block diagram of a micro electro-mechanical switch in accordance with one embodiment of the present invention.

A present invention micro electro-mechanical switch can be implemented in a variety of configurations with different mechanisms. FIG. 4A is a block diagram of micro electromechanical switch 410 in accordance with one embodiment of the present invention. Micro electro-mechanical switch 410 includes metal layer component 411, support component 412, relief layer 413, metal contact 414, control layer 415 and substrate 417. Metal layer component 411 is coupled to support component 412 which is coupled to substrate 417. Substrate 417 is also coupled to control layer 415 and metal contact 414. Metal layer component 411 is coupled to support component 412 at one end and is fabricated with a tension so that the other end of the metal layer component 411 curls away from metal contact 414 to form a free floating end. An electrical current can be selectively applied to control layer 415. When an electrical current is applied to control layer 415 it creates an electromagnetic field that attracts the free floating end of metal layer component 411 which bends down and makes contact with metal contact 414. When metal layer component 411 is in contact with metal contact 414 the switched is closed to form a circuit and electrical current can flow from metal layer component 411 to metal contact 414. When the electrical current is removed from control layer 415 the inherent tension in metal layer component 411 pulls the metal layer component 411 away from metal contact 414 opening the switch and breaking the current flow.

Figure 4B:
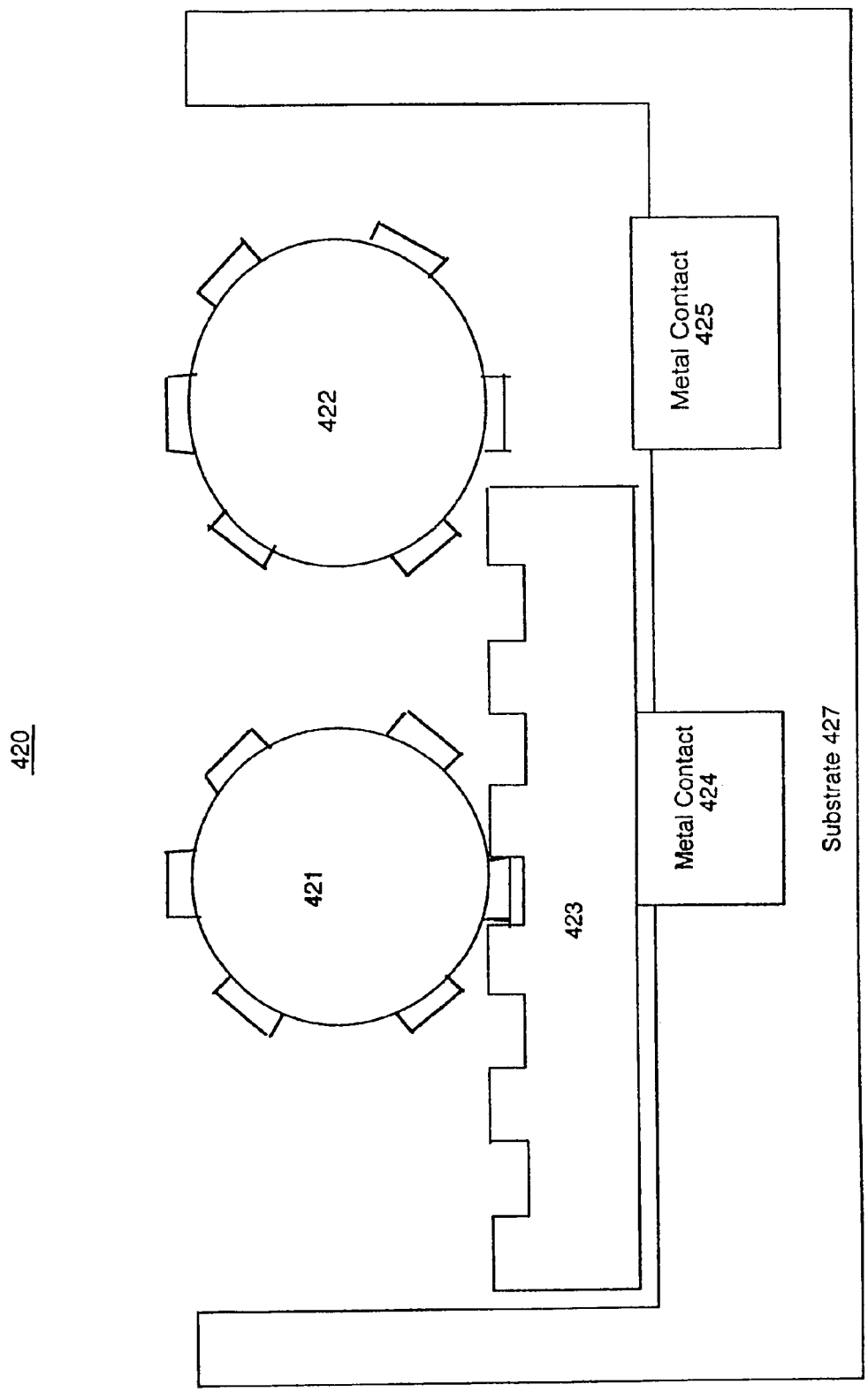
FIG. 4B is a block diagram of another exemplary micro electro-mechanical switch in accordance with one embodiment of the present invention.

FIG. 4B is a block diagram of micro electro-mechanical switch 420 in accordance with one embodiment of the present invention. Micro electro-mechanical switch 420 includes substrate 427, metal contacts 424 and 425, cog wheels 421 and 422, and metal slider 423. Substrate 427 is coupled to metal contacts 424 and 425. Substrate 427 is also coupled to micro electro-mechanical system (MEMS) motors (not shown) that rotate cog wheels 421 and 422. Cog wheels 421 and 422 are coupled so that the MEMS motors selectively rotate and drive or push metal slider 423 left and right. When micro electro-mechanical switch 420 is closed cog wheels 421 and 422 push the metal slider 423 so that metal slider 423 slides to the right and makes contact with metal contact 425 forming a path for electrical current to flow between metal contact 424 and metal contact 425. When micro electromechanical switch 420 is opened cog wheels 421 and 422 push the metal slider 423 so that metal slider 423 slides to the left and breaks contact with metal contact 425 decoupling the path and preventing electrical current from flowing between metal contact 424 and metal contact 4254.

Figure 4C:
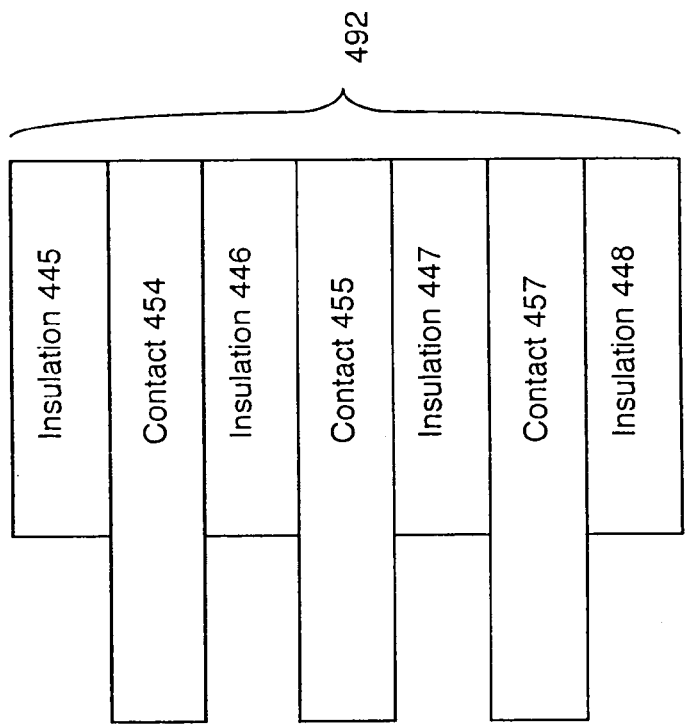
FIG. 4C is a block diagram of an exemplary micro electro-mechanical switch with multiple contacts in accordance with one embodiment of the present invention.
Figure 4C:
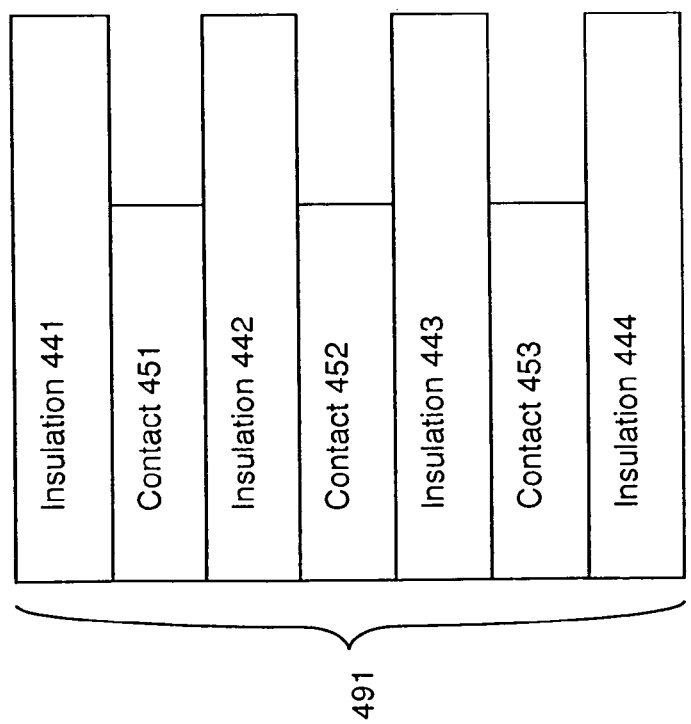

FIG. 4C is a block diagram of micro electro-mechanical switch 430 with multiple contacts in accordance with one embodiment of the present invention. Micro electro-mechanical switch 430 includes insulation barriers 441 through 448 and contacts 451 through 457. Insulation barriers 441 through 444 insulate contacts 451 through 453 from one another and form contact block 491. Similarly, Insulation barriers 445 through 448 insulate contacts 454 through 457 from one another and form contact block 492. Contact blocks 491 and 492 are shown in the "open" position and the contacts 451 through 453 are not in contact with contacts 454 through 457 respectively. In the "closed" position contact blocks 491 and 492 are pushed together until the contacts 451 through 453 are in contact with contacts 454 through 457 respectively. It is appreciated there are a variety of micro electro-mechanical system (MEMS) mechanisms for pushing contact blocks 491 and 492 together to "close" micro electro-mechanical switch 430 and pulling contact blocks 491 and 492 apart to open micro electro-mechanical switch 430. For example, electric fields can be generated to attract or repel the contact blocks. Electro-mechanical system (MEMS) motors can also be utilized to push the contact blocks 191 and 192 together or pull them apart. In one exemplary implementation, insulation barriers 441 through 448 include shields that are grounded and contacts 451 through 453 form "co-axial" contacts. In one embodiment of the present invention, contacts 451 through 457 are configured to correspond to a communication protocol and the number of contacts in each side of micro electro-mechanical switch 430 can corresponds to the number of signals in a communication protocol. For example, contacts 451 and 454 communicate a particular communication protocol signal when coupled together.

FIG. 5 is flow chart of semiconductor die micro electro-mechanical switch fabrication method 500 in accordance with one embodiment of the present invention. Semiconductor die micro electro-mechanical switch fabrication method 500 can be utilized to manufacture semiconductor dies with micro electro-mechanical switches that selectively couple and decouple components to buses. For example, the semiconductor die micro electro-mechanical switches can be implemented in a configuration to selectively prevent electrical current from flowing to components that are not being utilized to perform switching operations.

In step 510, a block of transistors are fabricated in a semiconductor die. In one exemplary implementation, components of the transistor (e.g., source, drain, gate channel, emitter, collector, base, etc.) are fabricated by selectively forming regions with different electrical properties (e.g., charge, conductor, insulator, etc.). The structures are formed through repeated application of various processing steps including, oxidation, photolithography, etching, diffusion, deposition, ion implantation and annealing.

In step 520, a bus trace is laid in the semiconductor die. The bus trace can by formed by diffusion and metalization processes and can be planarized by chemical mechanical polishing techniques. In embodiment, a bus includes a plurality of trace paths. The bus can be utilized to convey an electric current. For example, the bus can be a power bus and/or a signal bus (e.g., a clock signal).

In step 530, a micro electro-mechanical switch is fabricated in the path of the bus on the die in a position to couple and decouple the path of the bus. The micro electro-mechanical switch can be utilized to prevent or permit the flow of electric current in the path of the bus. The micro electro-mechanical switch can enable hot switching. In addition, the contacts of the micro electro-mechanical switch are electrically isolated (e.g., by a grounded shield) to provided high fidelity. For example, contacts of said micro electro-mechanical switch form a coaxial connection. The contacts of the micro electro-mechanical switch can be configured to make and break a plurality of connections (e.g., in accordance with communication protocols). In one exemplary implementation, the micro electro-mechanical switch is included in a relay array.

It is appreciated that the present invention can be implemented in a variety of embodiments. In one exemplary implementation the present invention can be utilized in processing systems utilized to provide a variety of graphics applications including video games. For example, the present invention can be utilized to distribute content for use in a game console, personal computer, personal digital assistant, cell phone or any number of platforms for implementing a video game. It is also appreciated that references to video game application implementations are exemplary and the present invention is not limited to these implementations.

Thus, the present invention enables efficient selective isolation of electrical components in a semiconductor die. A present invention micro electro-mechanical switch system and method facilitates power conservation by selectively preventing current from flowing in designated components minimizing adverse impacts associated with leakage current. The present invention facilitates elimination of semiconductor leakage at a semiconductor fabrication level for an entire device. A variety of implementations can benefit from reduced leakage impacts, including handheld battery dependant devices (e.g., cell phones, portable game players, notebook computers, etc.) and larger systems (e.g., desktops, servers, supercomputers, etc.) where megawatts of power can be saved over time by reducing wait-state leakage of thousands of idle processors components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A semiconductor transistor block management method comprising:
   supplying electric current to a bus located in a semiconductor die;
   closing a micro electro-mechanical switch in a path of said bus; and
   opening said micro electro-mechanical switch in said path of said bus, wherein said micro electro mechanical switch selectively couples and decouples a block of transistors to and from a bus, wherein said micro electro mechanical switch includes a plurality of contacts and is configured to make and break a plurality of connections simultaneously and interrupts electrical current flow in a plurality of lines in said buses when said micro electro mechanical switch is open, wherein said plurality of lines are correspondingly coupled to said plurality of contacts.

2. The semiconductor transistor block management method of claim 1 wherein said micro electro-mechanical switch prevents electrical current from flowing to said block of transistors when said micro electro-mechanical switch is open.

3. The semiconductor transistor block management method of claim 1 wherein said micro electro-mechanical switch is opened when said block of transistors are not being utilized to perform switching operations and closed when said block of transistors are being utilized to perform switching operations.

4. The semiconductor transistor block management method of claim 1 wherein said block of transistors are electrically isolated when said micro electro-mechanical system micro electro-mechanical switch is open.

5. The semiconductor transistor block management method of claim 1 wherein said micro electro-mechanical system switch permits electrical current to flow to said block of transistors when said micro electro-mechanical system relay switch is closed.

6. The semiconductor transistor block management method of claim 1 wherein said opening and said closing of said electro-mechanical switch is interlinked to other electromechanical switches to reduce wear and tear associated with said opening and said closing.

7. The semiconductor transistor block management method of claim 1 wherein said micro electro-mechanical switch is included in a micro electro-mechanical relay block.

8. The semiconductor transistor block management method of claim 1 wherein said bus is a power bus and said micro electro-mechanical switch selectively turns power on and off to said block of transistors.

9. The semiconductor transistor block management method of claim 1 wherein said bus is a signal bus and micro electro-mechanical switch selectively permits communication of said signal to said block of transistors.

10. A semiconductor transistor block management method comprising:
supplying electric current to a bus located in a semiconductor die;
closing a micro electro-mechanical switch in a path of said bus, wherein said micro electro-mechanical switch includes a plurality of contacts and said closing includes closing a plurality of connections simultaneously and permits electrical current flow in a plurality of lines in said bus when said micro electro-mechanical switch is closed;
opening said micro electro-mechanical switch in said path of said bus; wherein said opening includes opening a plurality of connections simultaneously and interrupts electrical current flow in a plurality of lines in said bus when said micro electro-mechanical switch is open;
wherein a plurality of contacts in said micro-electromechanical switch correspond to a plurality of signals and are correspondingly coupled to said plurality of lines.

11. The semiconductor transistor block management method of claim 10 wherein said bus conveys electric current to a transistor if said micro electro-mechanical switch is closed and prevents the flow of current to said transistor if said micro electro-mechanical switch is opened.

12. The semiconductor transistor block management method of claim 10 further comprising:
conveying power to a transistor if said micro electro-mechanical switch is closed; and
preventing power consumption by said transistor if said micro electro-mechanical switch is opened.

13. The semiconductor transistor block management method of claim 10 further comprising:
conveying a signal to a transistor if said micro electro-mechanical switch is closed; and
blocking said transistor from receiving a signal if said micro electro-mechanical switch is opened.

14. The semiconductor transistor block management method of claim 10 further comprising:
receiving an indication of the operations of said block of transistors; and
configuring a state of said micro electro-mechanical switch in accordance with said indication.

15. The semiconductor transistor block management method of claim 10 further comprising:
opening said micro electro-mechanical switch if said components coupled to said bus are not being utilized to perform operations; and
closing said micro electro-mechanical switch if components coupled to said bus are being utilized to perform operations.

16. The semiconductor transistor block management method of claim 10 wherein a plurality of micro electro-mechanical systems switches are included is said path of said bus.

17. A semiconductor transistor block management method comprising:
fabricating a block of transistors in a semiconductor die;
laying a bus in said semiconductor die;
fabricating a micro electro-mechanical switch in the path of said bus on said die in a position to couple and decouple said path of said bus; wherein said micro electro mechanical switch includes a plurality of contacts and is configured to make and break a plurality of connections simultaneously and interrupts electrical current flow in a plurality of lines in said buses when said micro electro mechanical switch is open, wherein said plurality of lines are correspondingly coupled to said plurality of contacts.

18. The semiconductor transistor block management method of claim 17 further comprising coupling said micro electro-mechanical switch to a control component for controlling operations of said micro electro-mechanical switch.

19. The semiconductor transistor block management method of claim 17 wherein said micro electro-mechanical switch enables hot switching.

20. The semiconductor transistor block management method of claim 17 wherein contacts of said micro electro-mechanical switch are electrically isolated to provided high fidelity and wherein said contacts are electrically isolated by a grounded shield to form a coaxial connection and said contacts of said micro electro-mechanical switch can be configured to make and break a plurality of connections.

* * * * *